UNITED STATES PATENT OFFICE.

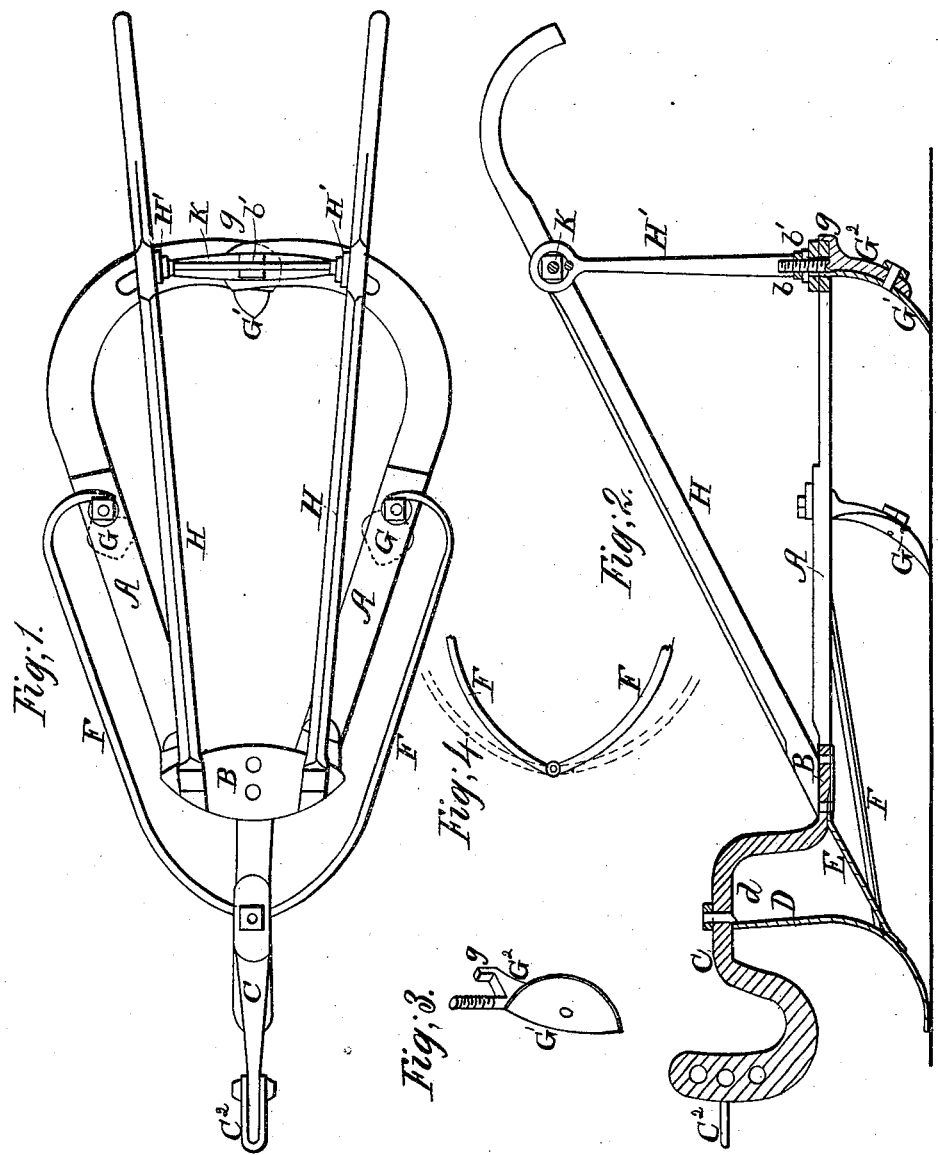

BOWMAN S. COX, OF PAULSBOROUGH, NEW JERSEY.

IMPROVEMENT IN CULTIVATORS.

Specification forming part of Letters Patent No. 98,471, dated January 4, 1870; antedated December 22, 1869.

*To all whom it may concern:*

Be it known that I, BOWMAN S. COX, of Paulsborough, in the county of Gloucester and State of New Jersey, have invented certain new and useful Improvements in Cultivators; and I do hereby declare the following to be a full, clear, and exact description thereof, reference being had to the accompanying drawings, forming part of this specification, in which—

Figure 1 is a top view of a cultivator as hereinafter described; Fig. 2, vertical longitudinal section of same; Fig. 3, shovel and beam detached from cultivator; Fig. 4, detached section of fender.

The principal improvement herein referred to is in the attachment of a fender or guard on each side of the cultivator-frame, and of a tooth used in connection therewith, to adapt the implement to better the cultivation of trailing vines—such as sweet-potatoes, melons, &c.—the tooth raising them up, while the guard disperses them on each side.

In the drawings, A is the cultivator-frame, consisting of two oblique bars hinged at their forward ends to the cross-pieces B, to allow the frame to be widened or narrowed, and at their rear ends curved inwardly and crossed, as shown clearly in Fig. 1.

The rear ends of said bars are slotted in the direction of their curved ends, to permit them to be regulated in distance apart by means of a screw, $b$, passing through the slots, and provided with a nut, $b'$.

C is the draft-beam, attached to the forward end of the cultivator-frame, and curved in a peculiar manner, as clearly represented in Fig. 2. The forward end, which turns up, is provided with a number of holes, by which a device, $C^2$, may be attached.

D is a long curved tooth connected by screw and nut to the upper part of the first curve, $d$, of the beam, so that it shall extend down between the legs thereof and forward, as seen in drawings. The front or face of said tooth should be rounded and the end pointed.

E is a brace connected with and extending diagonally between the tooth D and forward part, B, of cultivator-frame, holding the tooth firmly.

F is a guard or fender consisting of two bars the forward ends of which are hinged together behind the tooth D, or wherever most desirable for the purpose for which said bars are employed, thence extending on each side of and in the direction of the oblique bars of the frame A, a little ways out from said bars, and at their rear ends a little more than half the length of the bars back, curved inwardly and connected with the bars. The point where the said guards are hinged is lower than the points at which they are attached to the cultivator-frame, making a gentle decline, as seen in Fig. 2, toward the forward part. The fender may be widened with the cultivator-frame. In cultivating, the long tooth D sinks into the earth beneath the vines, and, as it goes forward, lifts the vines up and allows the fender to disperse them on either side of the cultivator. The tooth D, being of a considerable length, supports long vines, which rest against its face its whole length, while the peculiar form of the draft-beam prevents the vines which are taken up by said tooth from falling forward before the fender touches them.

G G G' are shovels, one of which is arranged on each side of the cultivator-frame, the shanks to which they are connected being held to the oblique bars by suitable bolt and nut. The one marked G' is situated at the back part of the cultivator, midway between the sides of the cultivator-frame. The shank $G^2$, to which it is attached, has a screw formed on its upper end, or attached thereto, like those of the shovels G G, which passes through the slots in the curved ends of the oblique frame-bars, and has a nut fixed on its end. The shovels G G G' are double-ended, the upper and lower parts being tapered and pointed alike. They are connected with their several shanks by suitable bolts and screws, as shown in Fig. 2, and may be removed and inverted as they become worn. The shank $G^2$, where it touches the under part of the frame, is extended back, and a flange, $g$, formed on it, which grasps the edge of the under oblique bar, and thus keeps said shank firmly in its place.

H H are the cultivator-handles, their forward ends attached securely to the front end of the frame. They are supported at the back by standards H' H', held to the handles by bolt and screw. Both these standards are composed of one piece, bent to form a horizontal cross-piece at I, which rests on the cultivator-frame, and which is provided with a hole in the center, through which passes the screw formed on the end of the shank G, the nut being placed thereon after the piece I.

K is a cross bar or brace connecting the handles at the points where the supporting-standards H' H' are attached.

What I claim as my invention is—

1. In a cultivator, the fender F and tooth D, constructed and arranged substantially as and for the purpose set forth.

2. Constructing the beam C with a portion bent to contain a long tooth, D, and prevent the vines from falling forward, substantially as set forth.

3. Constructing the rear ends of the oblique frame-bars as described, in combination with suitable bolt and screw, to connect and regulate the same.

4. In combination with oblique bars, as described, constructing and arranging the shank G, as and for the purpose set forth.

5. Constructing and arranging the standards H' H' as specified, in combination with the oblique bars, as set forth.

BOWMAN S. COX.

Witnesses:
   THOS. A. CONNOLLY,
   J. CONNOLLY.